United States Patent [19]

Schubert et al.

[11] 4,356,103
[45] Oct. 26, 1982

[54] LIQUID CRYSTALS FOR ELECTRO-OPTICAL DEVICES

[75] Inventors: Herrmann Schubert, Nehlitz; Gerhard Pelzl, Halle; Horst Zaschke, Halle; Dietrich Demus, Halle; Hans-Ulrich Nothni, Hoyerswerda; Frank Kuschel, Halle, all of German Democratic Rep.

[73] Assignee: Veb Werk für Fernsehelektronik, Berlin-Oberschöneweide, German Democratic Rep.

[21] Appl. No.: 147,254

[22] Filed: May 5, 1980

Related U.S. Application Data

[63] Continuation of Ser. No. 9,042, Feb. 2, 1979, abandoned.

[30] Foreign Application Priority Data

Feb. 6, 1978 [DD] German Democratic Rep. ... 203563

[51] Int. Cl.³ .............................. G02F 1/13; C09K 3/34
[52] U.S. Cl. .............................. 252/299.1; 252/299.01; 252/299.61; 350/350 S; 544/179
[58] Field of Search .................... 544/179; 252/299.01, 252/299.1, 299.61; 350/350 S

[56] References Cited

U.S. PATENT DOCUMENTS

| | | | |
|---|---|---|---|
| 3,166,399 | 1/1965 | Lutz et al. | 252/299.1 |
| 3,703,329 | 11/1972 | Castellano | 252/299.1 |
| 3,960,750 | 6/1976 | Moriyama et al. | 252/299.1 |
| 4,137,193 | 1/1979 | Osmam et al. | 252/299.1 |
| 4,139,273 | 2/1979 | Crossland et al. | 252/299.1 |
| 4,145,114 | 3/1979 | Coates et al. | 252/299.1 |
| 4,196,974 | 4/1980 | Haremg et al. | 252/299.1 |

FOREIGN PATENT DOCUMENTS

| | | | |
|---|---|---|---|
| 2257588 | 6/1973 | Fed. Rep. of Germany | 252/299.61 |
| 2841245 | 7/1979 | Fed. Rep. of Germany | 252/299.1 |
| 2841246 | 8/1979 | Fed. Rep. of Germany | 252/299.1 |
| 137242 | 8/1979 | German Democratic Rep. | 252/299.1 |
| 49-4502 | 2/1974 | Japan | 544/179 |
| 56-32579 | 4/1981 | Japan | 252/299.61 |
| 498300 | 1/1976 | U.S.S.R. | 544/179 |

OTHER PUBLICATIONS

Demus, D. et al., Mol. Cryst. Liq. Cryst., vol. 56 (Letters), pp. 115–121 (1979).
Schubert, H., Wiss. Z. Univ. Halle, vol. XIX '70M, H. 5, pp. 1–18.
Nash, J. A. et al., Mol. Cryst. Liq. Cryst., vol. 25, pp. 299–321 (1974).
Tani, C. et al., Appl. Phys. Lett., vol. 33, N. Y., pp. 275–277 (Aug. 1978).
Schubert, H. et al., J. Prakt. Chemie, vol. 312, pp. 494–506 (1970).
Grakauskas, V. A. et al., J. Am. Chem. Soc., vol. 80, pp. 3155–3159 (1958).
Arora, S. L. et al., Mol. Cryst. Liq. Cryst., vol. 10, pp. 243–257 (1970).
Gray, G. W. et al., Mol. Cryst. Liq. Cryst., vol. 37, pp. 157–188 (1976).
Demus, D. et al., Mol. Cryst. Liq. Cryst., vol. 15, pp. 161–174 (1971).
Demus, D. et al., Mol. Cryst. Liq. Cryst., vol. 23, pp. 207–214 (1973).

*Primary Examiner*—Teddy S. Gron
*Attorney, Agent, or Firm*—Jordan and Hamburg

[57] ABSTRACT

Liquid crystal compound for color modulation of light in electro-optical devices characterized by an oriented smectic C-phase with positive dielectric anisotropy. The compound has the property of a dichroitic dyestuff.

7 Claims, No Drawings

LIQUID CRYSTALS FOR ELECTRO-OPTICAL DEVICES

This is a continuation of application Ser. No. 009,042, filed Feb. 2, 1979, now abandoned.

BACKGROUND OF THE INVENTION

It is well known that nematic liquid crystals can be reoriented by the application of an electrical field. If the nematic film has been preoriented in the proper manner it can be used for making electro-optical devices (M. Tobias: International Handbook of Liquid Crystal Displays 1975-76, Ovum Ltd. London 1976; E. B. Priestley, P. J. Wojtowicz, Ping Sheng: Introduction to Liquid Crystals, Plenum Press, New York-London 1975).

In a specific application the "guest host effect" takes place in these devices due to the addition of a dichroitic dyestuff. (G. H. Heilmeier, L. A. Zanoni: Appl. Phys. Lett. 13, 91 (1968): Mol. Cryst. Liqu. Cryst. 8. 293 (1969).

However, the decay times for this kind of device under normal operating conditions are about 5 to 10 times as long as the rise times. This makes the use of these devices impractical for many applications.

The reason is that in nematic liquid crystals because of the low elastic constants, the coupling to the adjoining electrodes is too faint and the forces which cancel out the elastic deformation by the electric field are too weak.

It is therefore an object of the invention to provide for electro-optical structural elements on the basis of the principle of liquid crystals which have decay times not higher than the rise times and can therefore be switched, that is turned on or turned off more rapidly.

SUMMARY OF THE INVENTION

The invention is based on the finding that crystals of the smectic type have higher elastic constant values and therefore result in more rapid decay times. The invention is therefore based on the dichroism of smectic C-phases for obtaining color contrasts in electro-optical elements.

In particular it is based on the finding that smectic C-phases which have a positive dielectric anisotropy and which as such possess the properties of a dichroitic dyestuff can be reoriented in an electrical field and result then in a color modification of clearly discernible contrast. They are therefore suited for use in electro-optical structural elements for the purpose of modulating the transmittent or incident light and for the color reproduction of numbers, symbols and images.

The decay times of the modulating effects are considerably shorter than those in the guest-host cells made with nematic compounds and the decay times are normally shorter also than the rise times. By increasing the voltage the rise times can be further shortened so that a predetermined equalization of rise times and decay times is possible.

The structural elements made according to the invention can be used for instance in electrical clocks, pocket calculators and various measuring instruments, particularly battery operated instruments intended for indication of digital data.

For the purposes of the invention the smectic C-phases of the following type of compounds are particularly suited:

3,6-bis-(4-n-alkyl-phenyl)-1,2,4,5 tetrazine,
4-n-alkyl-4'-n-alkyloxy-3,6-diphenyl-1,2,4,5-tetrazine or
6-n-alkyl-3-(4-n-alkyloxy-phenyl)-1,2,4,5-tetrazine, the alkyl and alkyloxy chains having 1 to 12 carbon atoms The compounds can be used by themselves or in an intermixture between different compounds of the type indicated or as a mixture with other compounds which are in the smectic C-phase state.

The smectic C-phases in these cases are obtained by cooling a preoriented nematic phase down to the smectic phase range.

The contrast effect of the devices can be improved further by adding a dyestuff exhibiting positive dichroism which is absorbing in a spectral range other than the compounds of the invention.

PREFERRED EMBODIMENTS

EXAMPLE 1

The compound used in this case was 6-n-heptyl-3-(4-n-pentyloxy-phenyl)-1,2,4,5-tetrazine of the formula

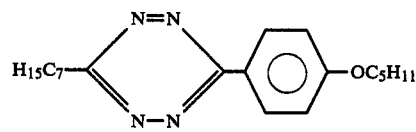

It has a phase change scheme as follows:
Cryst. solid 49.5° C. smectic C 52.5° C. nematic 62.5° C. isotropic The device was obtained as follows: An oriented planar film in the nematic phase was formed as conventional, for instance between rubbed or vapor-deposited slides on which a deposit of tin dioxide was formed. If the film was cooled into the range of the smectic C-phase the planar orientation of the molecular axes was mostly retained.

The specimens had a faint pink color if the incident light was polarized parallel to the rub direction. When an electric field was applied the color became clearly and visually perceptibly stronger towards an intense red-violet. The contrast was about as distinct as in case of the analogous effect in the nematic phase.

Even with unpolarized light there was a clear color modulation from pink to red violet though the contrast was less than with polarized light.

The threshold voltage was 12 v at 52° C. and the thickness of the film was 10μ.

The rise/decay times were as follows (rise time $t_{an}$; decay time $t_{ab}$):

|           | 30 V | 40 V | 50 V |
|-----------|------|------|------|
| $t_{an}$(ms) | 56   | 40   | 30   |
| $t_{ab}$(ms) | 38   | 42   | 44   |

EXAMPLE 2

This device was formed in the analogous manner to Example 1 with the following compound
3,6-bis-(4-n-nonyl-phenyl)-1,2,4,5-tetrazine of the formula

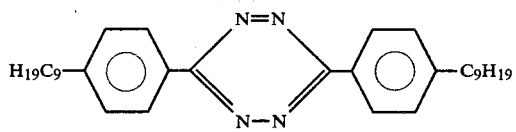

The phase scheme in this case was as follows:

Cryst. solid 739° C. smectic C 145° C. nematic 150° C. isotropic

The threshold voltage was 15 V at 141° C. and a film thickness of 10μ.

The rise/decay times were as follows:

|            | 30 V | 40 V | 50 V |
|------------|------|------|------|
| $t_{an}$(ms) | 17   | 16   | 15   |
| $t_{ab}$(ms) | 2.3  | 2.5  | 2.5  |

EXAMPLE 3

In this case the device was made also as described in Example 1. The compound used was 4-n-octyl-4'-n-octyloxy-diphenyl-1,2,4,5-tetrazine of the formula

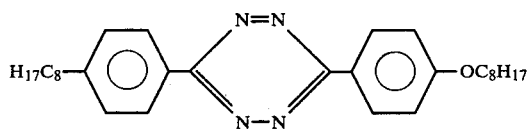

The phase change had the following scheme:

Cryst. solid 127° C. smectic C 162.5° C. nematic 172.5° C. isotropic

The threshold voltage was 17 volt at 148° C. and a film thickness of 10μ.

The rise and decay times were

|            | 30 V | 40 V | 50 V |
|------------|------|------|------|
| $t_{an}$(ms) | 16   | 15   | 14   |
| $t_{ab}$(ms) | 2    | 2    | 2    |

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In an electro-optic display employing a smectic liquid crystal composition for modulation of transmitted or reflected light and rendering numerals, symbols, and images in color, the improvement wherein said liquid crystal composition comprises a compound selected from the group consisting of 3,6-bis-(4-n-alkylphenyl)-1,2,4,5-tetrazine, 4-n-alkyl-4'-n-alkoxy-3,6-diphenyl-1,2,4,5-tetrazine, 6-n-alkyl-3-(4-n-alkoxyphenyl)-1,2,4,5-tetrazine, and mixtures thereof, having from one to 12 carbon atoms in the alkyl and alkoxy chains, said composition employed as a planarly oriented, smectic C phase of positive dielectric anisotropy and possessing the properties of a dichroitic dyestuff.

2. The display of claim 1 wherein the smectic C phase is obtained by cooling an oriented nematic phase of said compound into the smectic range.

3. The display of claim 2 wherein said compound in the form of the smectic C phase is in admixture with at least one additional compound in the form of the smectic C phase too.

4. The display of claim 1 additionally comprising a positive dichroitic dyestuff absorbing light in a different spectral range than said compound.

5. The display of claim 2 wherein said compound is 6-n-heptyl-3-(4-n-pentyloxyphenyl)-1,2,4,5-tetrazine.

6. The display of claim 2 wherein said compound is 3,6-bis-(4-n-nonylphenyl)-1,2,4,5-tetrazine.

7. The display of claim 2 wherein said compound is 4-n-octyl-4'-octyloxy-3,6-diphenyl-1,2,4,5-tetrazine.

* * * * *